(12) United States Patent
Early et al.

(10) Patent No.: US 9,400,001 B2
(45) Date of Patent: Jul. 26, 2016

(54) HYDRAULIC SYSTEM

(75) Inventors: Ciaran Early, Dublin (IE); Gary Murray, Dublin (IE); Raymond Honour, Kent (GB)

(73) Assignee: THE SAFER PLUG COMPANY LIMITED, Grand Cayman (KY)

(*) Notice: Subject to any disclaimer, the term of this patent is extended or adjusted under 35 U.S.C. 154(b) by 284 days.

(21) Appl. No.: 14/008,037

(22) PCT Filed: Mar. 31, 2011

(86) PCT No.: PCT/EP2011/055061
§ 371 (c)(1),
(2), (4) Date: Sep. 27, 2013

(87) PCT Pub. No.: WO2012/130323
PCT Pub. Date: Oct. 4, 2012

(65) Prior Publication Data
US 2014/0013737 A1    Jan. 16, 2014

(51) Int. Cl.
*F15B 1/02*    (2006.01)
*F16L 55/38*   (2006.01)

(52) U.S. Cl.
CPC .. *F15B 1/02* (2013.01); *F16L 55/38* (2013.01)

(58) Field of Classification Search
CPC ............................. F16L 55/1283; F16L 55/38
USPC .............................................. 60/413; 138/89
See application file for complete search history.

(56) References Cited

U.S. PATENT DOCUMENTS

| 4,465,104 | A | * | 8/1984 | Wittman | F16L 55/1283 138/89 |
| 4,854,384 | A | * | 8/1989 | Campbell | F16L 55/1283 166/122 |
| 5,208,936 | A | * | 5/1993 | Campbell | B08B 9/0557 15/104.061 |
| 5,293,823 | A | | 3/1994 | Box | |
| 5,924,454 | A | * | 7/1999 | Dyck | F16L 55/1283 138/89 |
| 8,042,574 | B2 | * | 10/2011 | Mellemstrand | F16L 55/1283 138/89 |
| 2010/0071487 | A1 | | 3/2010 | Kampbell | |

FOREIGN PATENT DOCUMENTS

GB    2235745    3/1991

OTHER PUBLICATIONS

International Search Report dated Nov. 11, 2011.

* cited by examiner

*Primary Examiner* — Thomas E Lazo
(74) *Attorney, Agent, or Firm* — Hoffmann & Baron, LLP

(57) ABSTRACT

An hydraulic system for an autonomous multi-set pipeline isolation tool comprising an hydraulic piston; a pump for operating the pistons; an accumulator between each of the hydraulic pistons and the pump; and means for operating the pump. The system also comprises a manifold operable to control the flow of fluid in fluid pipelines to control the operation of the pistons which actuate gripping and sealing means of the autonomous multi-set pipeline isolation tool. The hydraulic system further comprises a controller comprising a number of operational modules which are positioned on a single printed circuit board. The advantage of this is that the size of the hydraulic system may be minimized thereby enabling use of the system within a pipeline having an inner diameter of the order of 0.15 m (6") and upwards. The manifold of the hydraulic system is also provided with a triple fail safe redundancy mechanism.

28 Claims, 19 Drawing Sheets

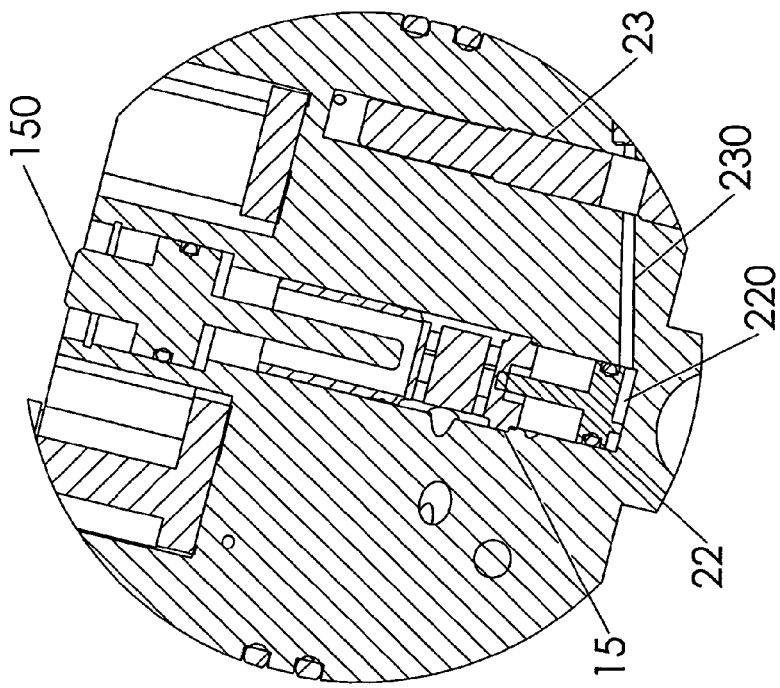
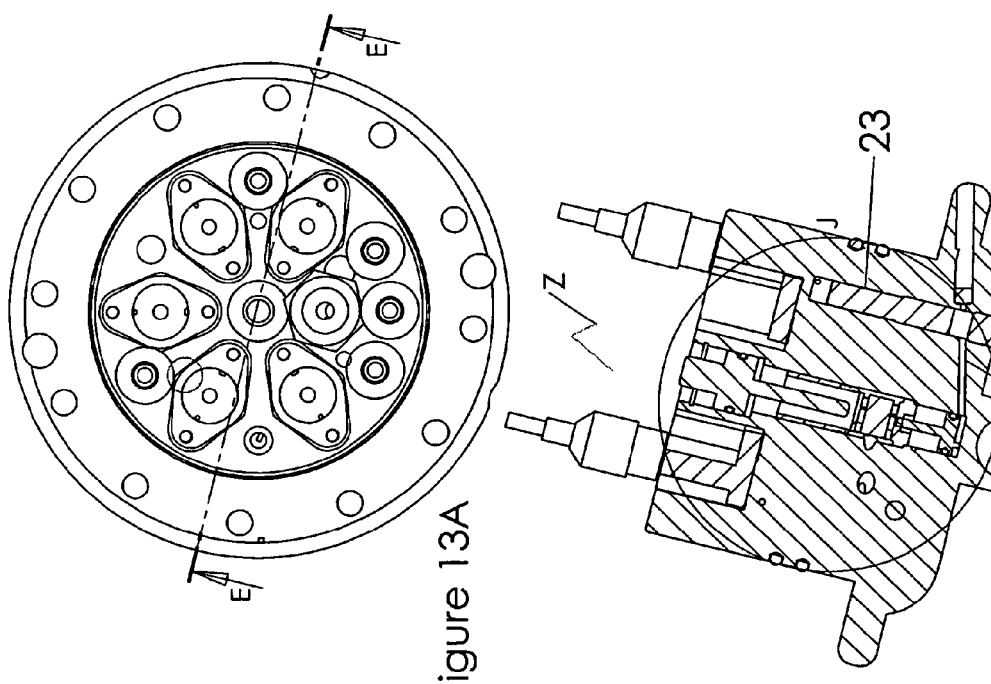

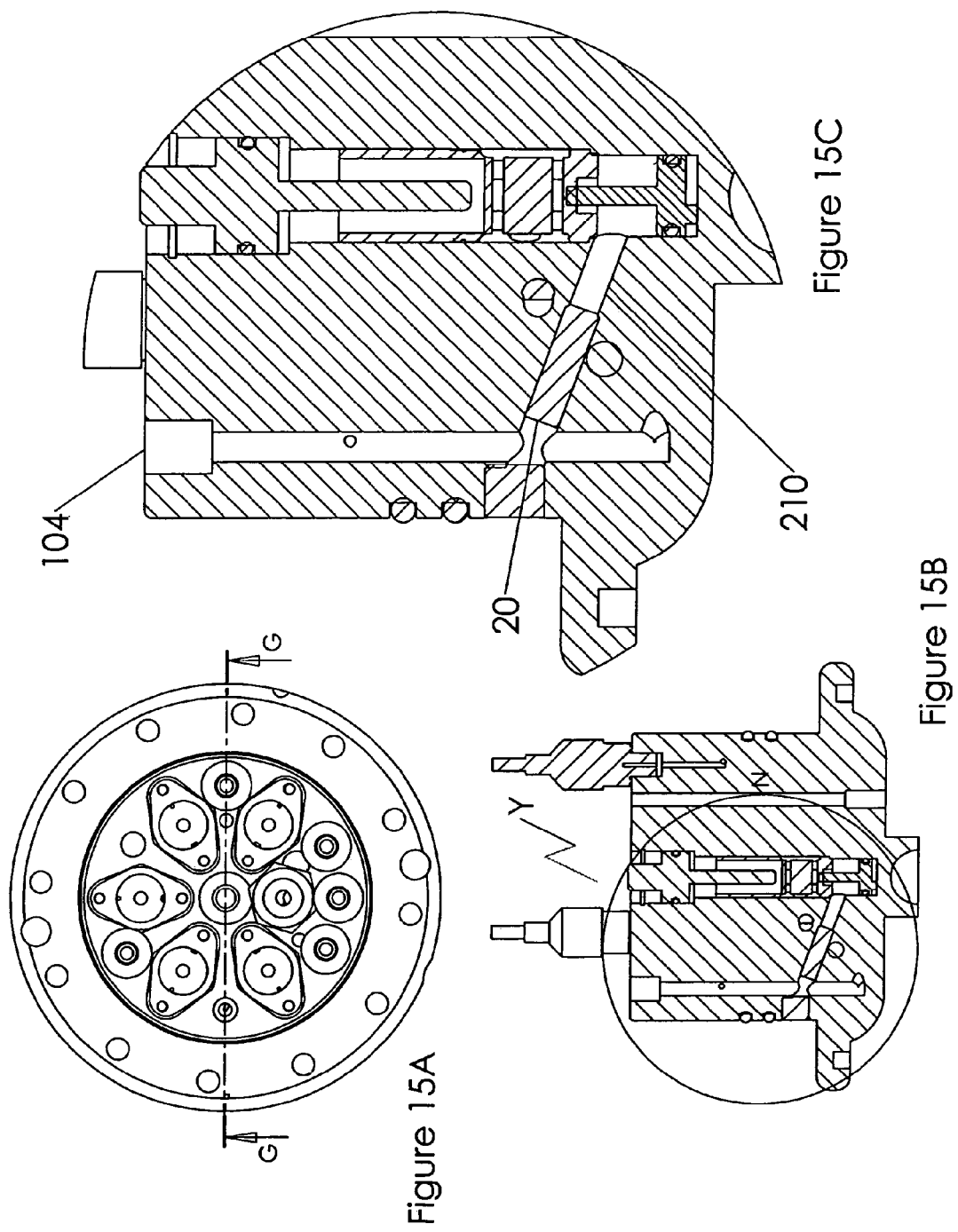

HYDRAULIC SYSTEM

This application is the U.S. National Phase of, and Applicants claim priority from, International Patent Application Number PCT/EP2011/055061 filed 31 Mar. 2011, which is incorporated herein by reference.

The present invention relates to an hydraulic system for a high pressure autonomous pipeline isolation tool used in pipeline isolation and in particular to an autonomous multiset pipeline isolation apparatus using the hydraulic system for isolation of pressurised pipelines including 0.15 m (6") diameter pipelines.

It is commonly known that oil and gas are transported from source to secondary locations using pressurised pipeline transportation systems. Regulatory authorities require a high degree of safety when conducting maintenance on such pressurised pipeline transportation systems. These safety standards are enforced by insisting on regular planned maintenance programmes, which usually require a complete shut down of the pipeline system before routine or emergency intervention can be conducted. Due to high energy prices deferred production options caused by maintenance shut downs are no longer acceptable. Pipeline owners now require their pipelines to be operational all of the time.

Pipeline isolation for repair and maintenance was traditionally managed using depressurisation, hot taps, stopples, tethered plugs, freeze plugs and high friction plugs.

These traditional methods for isolating pipelines within a high pressure pipeline transportation system in order to conduct replacement or repair are no longer preferable. The traditional methods have been superseded by more advanced technology, known as autonomous pipeline isolation using extremely low frequency (ELF) remote communication systems. Through pipe wall ELF technology is now a preferred option for pipeline owners as it can reduce the shutdown time in many cases by at least a factor of ten.

However, autonomous pipeline isolation plugs are currently bespoke pieces of apparatus, which are complex to build across a range of sizes. Each size autonomous pipeline isolation plug can employ different software, electronics, hydraulics and so forth. All of these separate components equate to an essentially bespoke control and operating system which is dependent on the size of plug being built. Furthermore on occasions autonomous pipeline isolation plugs can fail meaning that the isolation plug is stuck in a set position blocking the pipeline. This is not acceptable due to delay and loss of revenue whilst trying to remove the autonomous pipeline isolation plug and reopen the pipeline.

It is to be understood that the terms autonomous pipeline isolation apparatus, autonomous pipeline isolation tool, autonomous pipeline isolation plug and double block and bleed autonomous pipeline isolation tool are used interchangeably throughout the specification to describe a tool which is used to isolate a section of a pipeline transportation system. The term double block and bleed is used to describe the provision of two barriers within a section of pipe and the ability to depressurise the section of pipe between the two barriers. It is also understood that the term 'multi-set' in relation to pipeline isolation tools means a tool that is re-settable, that means that the isolation tool can be used to isolate a pipeline on more than one occasion.

Presently there are multiset autonomous pipeline isolation plugs in varying sizes between 0.32 m (12") and 1.52 m (60") in diameter. However the majority of the world's pipeline transportation systems employ 0.15 m (6") sized pipe in diameter. Previously it was not considered possible to build bespoke autonomous pipeline isolation tools that had sufficient reliability to allow remote multiset isolation of a pipeline at sizes below 0.32 m (12") in diameter.

It was not considered possible to reduce the size of the hydraulic system within an autonomous pipeline isolation tool sufficiently in order for the hydraulics to be accommodated within the packaging or manifold necessary for a smaller isolation tool whilst ensuring that the isolation tool is able to negotiate through the sometimes complex geometric paths of the pipeline. Furthermore it was also considered that the reliability of a smaller sized hydraulic system could not be guaranteed. As expressed above it would not be acceptable for an isolation tool to become blocked within a pipeline during a planned or unplanned shutdown period.

It is therefore an object of the present invention to provide an hydraulic system for an autonomous pipeline isolation tool. The hydraulic system being suitable for use in a wide range of autonomous pipeline isolation tools including those sized for pipelines having an internal diameter of 0.15 m (6"). It is also an object of the invention to provide an autonomous pipeline isolation tool, which is suitable for use in a wide range of pipelines including internal diameter of the order of 0.15 m (6") and upwards a 0.15 m (6") pipeline in diameter.

Throughout the following description reference will be made to the present invention in relation to a pipeline transportation system which has 0.15 m (6") pipelines, It will be understood that the hydraulic system of the invention and the autonomous pipeline isolation tool of the invention is suitable for use in a wide range of pipeline sizes, including but not limited to, pipelines between 0.15 m (6") and 1.52 m (60") in diameter or indeed pipelines with diameters less than 0.15 m (6"). Accordingly, reference to the use of the present invention in relation to 0.15 m (6") pipelines in diameter should not be seen as limiting.

It is acknowledged that the term 'comprise' may, under varying jurisdictions be provided with either an exclusive or inclusive meaning. For the purpose of this specification, the term comprise shall have an inclusive meaning that it should be taken to mean an inclusion of not only the listed components it directly references, but also other non-specified components. Accordingly, the term 'comprise' is to be attributed with as broad an interpretation as possible within any given jurisdiction and this rationale should also be used when the terms 'comprised' and/or 'comprising' are used.

Further aspects of the present invention will become apparent from the ensuing description which is given by way of example only. According to the invention, there is provided an hydraulic system for an autonomous multi-set pipeline isolation tool comprising:
  at least one hydraulic piston;
  a pump for operating the pistons;
  an accumulator between each of the hydraulic pistons and the pump;
  means for operating the pump; and
  a manifold comprising a plurality of fluid pipelines positioned between the pump and the hydraulic pistons, the manifold being operable to control the flow of fluid in the fluid pipelines to control the operation of the pistons which actuate gripping and sealing means of the autonomous multi-set pipeline isolation tool.

Accordingly, the present invention provides an hydraulic system for an autonomous multi-set pipeline isolation tool as described in more detail below.

In another embodiment of the invention, the manifold further comprises a plurality of valves arranged within the fluid pipelines.

In another embodiment of the invention, the valves are selected from one or more of: solenoid valves, check valves, trigger valves, detenting valves, pressure relief valves and shuttle valves.

In another embodiment of the invention, the valves are positioned in line with one or more pressure transmitters.

In another embodiment of the invention, the pressure relief valves are in communication with one or more pressure transmitters.

In another embodiment of the invention, the valves comprise an integrated detenting valve which is in communication with a pre-set pressure relief valve.

In another embodiment of the invention, the manifold comprises a triple redundancy fail safe unset system.

In another embodiment of the invention, the triple redundancy fail safe unset system comprises independently operable primary, secondary and tertiary unset systems.

The triple redundancy fail safe unset system ensures that the pistons of the hydraulic system can always be opened. Thus when the hydraulic system of the invention is used within an autonomous pipeline isolation tool the triple redundancy fail safe unset system ensures that the isolation tool will always disengage from a pipeline wall thereby ensuring that the section of pipeline being isolated by the isolation tool can be reopened.

In another embodiment of the invention, each of the unset systems comprises a depressurisation circuit which is coupled with at least one hydraulic piston and the accumulator.

In another embodiment of the invention, the depressurisation circuit further comprises activation means.

In another embodiment of the invention, the primary unset system comprises an ELF controlled system whereby solenoid valves are activated to unload the hydraulic fluid back to the accumulator. This process is activated by ELF communication.

In another embodiment of the invention, the secondary unset system comprises a hyperbaric or hydrostatic upset unset system wherein the unset system is activated on detection of a hydrostatic spike.

Operation of the secondary independent unset system is now described with reference to a hydraulic system of the invention contained within an autonomous pipeline isolation tool positioned within a pipeline. In use, the secondary independent unset system operates as follows a hydrostatic spike is introduced to the pipeline which lifts the pre-set pressure relief valve. This allows pressure to move a piston which drives a shuttle within the integrated detenting valve forward causing the integrated detenting valve to deflect. The shuttle comprises ball bearings, which lock within the integrated detenting valve which in turn enables piston fluid in the pipeline isolation tool to move back to the accumulator under the force of the pipeline isolation tool piston springs.

In another embodiment of the invention, the tertiary unset system comprises a timed decay unset system.

Optionally the depressurisation circuit of the tertiary unset system comprises an independent printed circuit board and power supply. In the preferred embodiment of the invention the activation means of the tertiary unset system is a real time clock. It is also possible to activate the depressurisation circuit using any other suitable means known to a person skilled in the art, for example, a super-capacitor. The advantage of using a real time clock as an activation means to activate the depressurisation circuit allows a user to programme the time period in which the depressurisation circuit will be activated.

Conveniently, in the preferred embodiment of the invention the activation means of the tertiary unset system is powered by its own independent dedicated power supply, for example a stacked battery supply. The advantage of this is that the depressurisation circuit is activated by mechanical means and provides a fail safe method of depressurising an autonomous pipeline isolation tool in the event of primary electronic or communications failure, or of secondary pipeline hydrostatic spike failure.

In an alternative embodiment, the hydraulic system further comprises at least two hydraulic pistons.

In another embodiment of the invention, the hydraulic system comprises a controller.

In another embodiment of the invention, the controller comprises at least a power supply unit and a central processing unit.

In another embodiment of the invention, the controller comprises one or more of: a hydraulic management module, a valve management module, a communications module, a diagnostics module, a monitoring module and a safety module.

In another embodiment of the invention, the communications module comprises at least one transmitter element and one receiver element.

The central processing unit is programmed to control sensors, pressure transmitters, pump, motors, valves and relays of the hydraulic system of the invention. In this way the hydraulic system of the invention is operated by a controller in a manner enabling the controller to manage aspects of the hydraulic system including for example, communications, valving, monitoring and safety aspects. It is understood that the hydraulic system and controller are used to operate gripping and sealing means of an autonomous pipeline isolation tool. Conveniently this enables a user to isolate a section of a pipeline transportation system.

In another embodiment of the invention, the modules of the controller are provided on a single printed circuit board (PCB). Ideally, the hydraulic system and controller are suitable for use across a range of autonomous pipeline isolation tools having different external diameters. An advantage of the controller of the invention is that the modules of it are arranged on a single printed circuit board. Thus the controller of the invention enables appreciably smaller components to be used to form the modules, which are adapted to output or transmit signals which control the hydraulic system of the invention.

Advantageously in this embodiment of the invention the PCB system eliminates the requirement for a separate mother board, a separate transmit and receive board and separate controller boards which are necessary in currently available autonomous pipeline isolation apparatus. Conveniently the controller is easily slotted into a wide range of larger sized autonomous pipeline isolation tools and is generically designed to control all sizes of isolation plugs from 0.15 m (6") to 1.52 m (60") in diameter. Optionally in one embodiment of the invention the printed circuit board is a planar board having an elongated longitudinal axis.

In practice, the elemental components of the controller are suitably arranged on a single printed circuit board to achieve the required functionality of the controller. Ideally the elemental components of the controller are radically smaller in size than those used in prior art controllers. Conveniently the printed circuit board is of constant size which is appropriately sized for use inside an isolation tool to isolate a 0.15 m (6") diameter pipe. In one example of the invention, the controller is a unique in house printed circuit board which has miniature original equipment manufacture (OEM) components suitably arranged thereon to achieve the functionality of the controller.

In another embodiment of the invention, the controller further comprises interrogation means for monitoring output values from pressure sensors, Linear Variable Differential Transformers (LVDT), valve controllers, the hydraulic pump motor and power supplies.

In another embodiment of the invention, the controller further comprises interpretation means for analysing output values received from the interrogation means.

In another embodiment of the invention, the controller further comprises means for generating and transmitting signals both in response to output values received from the interrogation means and in response to pre-programmed operating instructions to operate the valve controllers and the hydraulic pump motor to set and unset the autonomous pipeline isolation tool.

In another embodiment of the invention, the controller further comprises an audio communication control system that uses acoustic or audio algorithms for through pipe wall communication.

In a further embodiment of the invention, the controller comprises two communication mediums acoustic and extremely low frequency (ELF) technologies. Advantageously the audio communications conserve battery life in certain pipeline isolation applications.

In another embodiment of the invention, the means for operating the pump comprises a motor which is powered by a 12 volt power supply unit.

All current isolation plug control systems are operated by a 24 volt to 48 volt supply systems. Accordingly the controller and autonomous pipeline isolation apparatus of the present invention are much safer than those currently available.

In another embodiment of the invention, the hydraulic system further comprises a housing, wherein the geometry of the housing is configured to enable articulation of the hydraulic system around a 3D bend within a pipeline having an inner diameter of the order of 0.15 m (6") and upwards. It will be understood that the term 3D is a known term within the pipeline industry which refers to three times the nominal diameter of the pipe, for example, a 3D bend in a 0.15 m pipeline refers to the bend having a nominal radius of 0.45 m.

In another embodiment of the invention, the housing is a sealed unit surrounding and encapsulating the controller and hydraulic system.

In another embodiment of the invention, the housing comprises articulation means configured to couple an end of the housing to an end of a module of an autonomous pipeline isolation tool.

In another embodiment of the invention, the articulation means comprises an articulating double ball and socket joint.

Optionally, the housing thus provides a sealed unit surrounding and encapsulating the controller and hydraulic system of the present invention.

Accordingly, there is provided a housing within an autonomous pipeline isolation tool for receiving the controller and hydraulic system of the present invention. Conveniently the geometry of the housing is configured to enable it to articulate around a 3D 0.15 m (6 inch) diameter bend. As outlined above it will be understood that the term 3D refers to three times the nominal diameter of the pipe.

According to a further aspect of the invention, there is provided an autonomous multi-set pipeline isolation tool comprising:
a pressure plate module with gripping and sealing means encircling the pressure plate module;
the gripping and sealing means being operable by an hydraulic system comprising at least one hydraulic piston;
a pump for operating the piston;
an accumulator between each of the hydraulic pistons and the pump;
means for operating the pump; and
a manifold comprising a plurality of fluid pipelines positioned between the pump and the hydraulic pistons, the manifold being operable to control the flow of fluid in the fluid pipelines to control the operation of the pistons which actuate gripping and sealing means of the autonomous multi-set pipeline isolation tool.

The invention will now be described more particularly with reference to the accompanying drawings, which show by way of example only some embodiments of an autonomous pipeline isolation apparatus of the invention.

In the drawings,

FIG. 13A is a bottom view of the manifold of the invention;

FIG. 13B is a section view of the manifold of FIG. 13A along the line E-E showing the integrated detenting valve of the hydrostatic upset mechanism;

FIG. 13C is an enlarged view of section Z of FIG. 13B;

FIG. 15A is a bottom view of the manifold of the invention;

FIG. 15B is a section view of the manifold of FIG. 15A along the line G-G showing fluid return to the accumulator released by the integrated detenting valve in the hydrostatic upset mechanism;

FIG. 15C is an enlarged view of section Y of FIG. 15B;

Figure 17:
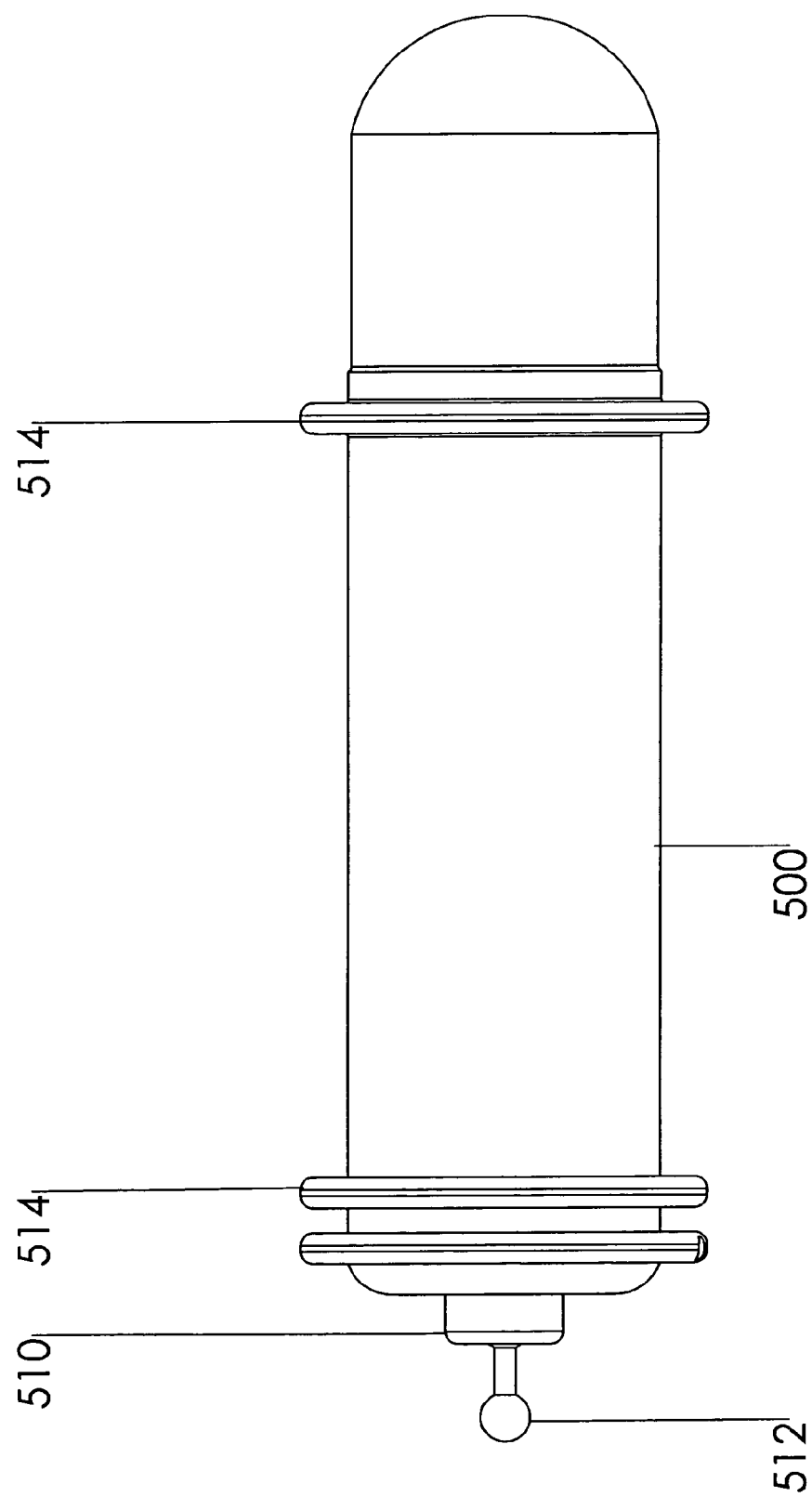
FIG. 17 is a side view of the housing containing the hydraulic system and controller of the invention.
Figure 18:
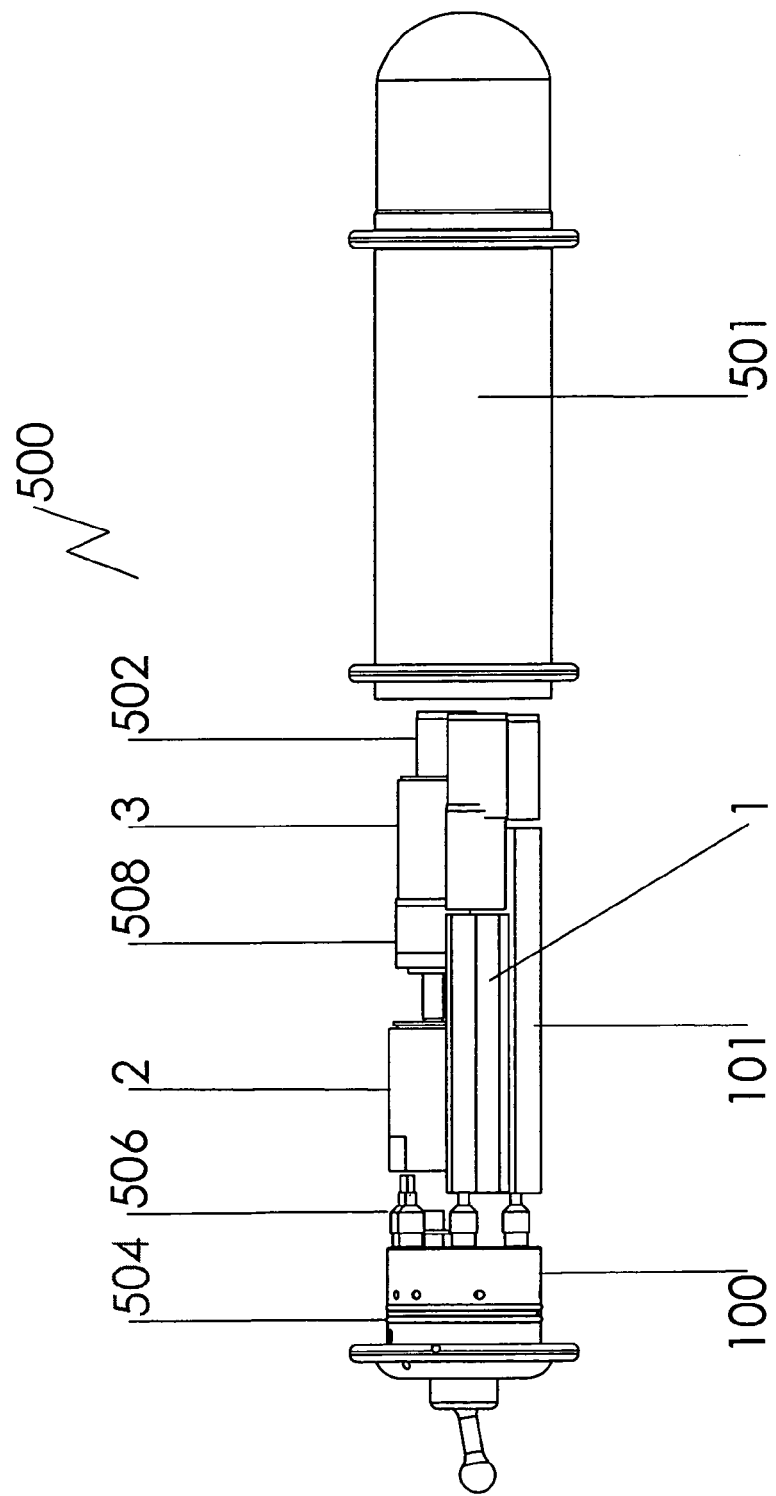
FIG. 18 is a side view of the hydraulic system including the manifold and controller of the invention with the housing removed.

Referring initially to FIGS. 1 to 7 and 17 and 18, there is shown an hydraulic system of the present invention seated within a housing 501 forming a unit known as a control pod 500 of an autonomous pipeline isolation apparatus. Specifically FIG. 17 shows the control pod 500 with the housing 501 in position whilst FIG. 18 shows the relative positions of the component parts of the hydraulic system when the housing 501 is removed. The arrangement of the component parts will be described with reference to the schematic diagrams of FIGS. 1 to 7, therein the manifold of the present invention is denoted generally by the reference numeral 100.

Figure 19:
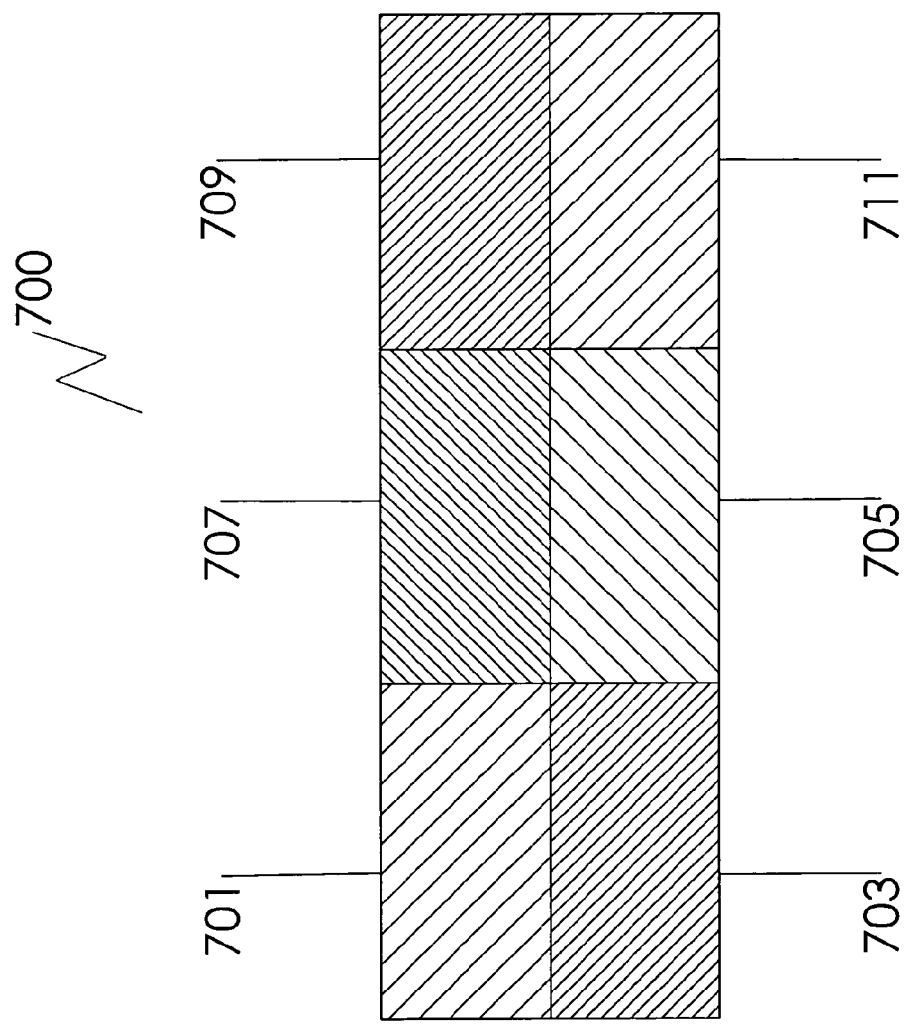
FIG. 19 is a schematic drawing of the printed circuit board of the controller of the invention.

Housing 501 is provided with a ball and socket 510 joint adjacent the manifold 100. Section 512 of the ball and socket joint 510 is provided with a ball at each of the opposing ends to enable the housing to connect to other modules of an autonomous pipeline isolation tool by seating in socket joints on the other modules. Housing 501 is provided with seating positions 514 for packing means to enable the control pod 500 to position itself in a desired location within a pipeline. FIG. 19 is a schematic drawing of the printed circuit board 700 housed within the control pod 500. The single printed circuit board has its own power supply unit 701. It further comprises a hydraulic management module 703 together with a valve management module 705 which operate together to control and manipulate the hydraulic system of the invention. Printed circuit board 700 further comprises a communications module 707 which contains at least one transmitter and one receiver (not shown). In addition to this the printed circuit board also comprises a monitoring module 709 and a safety control module 711.

In the instance shown, the hydraulic system comprises independent hydraulic pistons 9 and 19, which are driven by hydraulic pump 2 which is operated and controlled by a controller 101. Although the following description and drawings make reference to the hydraulic system of the present invention as having two pistons it will be understood that the present invention may also be enabled by a single piston, or alternatively three, four, or more pistons. For this reason, reference to two pistons in the following should in no way be seen as limiting. When the hydraulic system of the present invention is provided with a single piston, this in turn will enable a pipeline isolation tool to provide a single gripping and sealing barrier within a pipeline. In contrast a hydraulic system having two pistons is able to provide a second gripping and sealing barrier, to achieve in particular a double block and bleed functionality within a pipeline.

Accumulator 1 is a pressurised reservoir which feeds oil into hydraulic pump 2. Hydraulic pump 2 is driven by a motor 3 and gearbox 508 powered by a 12V power supply 502. Line 4 from hydraulic pump 2 denotes the normal pressurisation lines to the manifold 100 and subsequently divides into two pressurisation lines 8 and 18 which feed into hydraulic pistons 9 and 19 respectively. There are two o-rings 504 positioned around the manifold 100 to provide an adequate seal between the manifold 100 and the control pod housing 501. A plurality of pressure transmitters 506 in communication with manifold 100 are visible within the housing 501 (FIG. 18).

The manifold 100 comprises a triple redundancy fail safe unset system. In the preferred embodiment of the invention the primary independent unset system is an ELF electrical unset system whereby the open valve has the ability to push fluid back to the accumulator via the plug piston springs. The secondary independent unset system is an emergency unset that employs either a hyperbaric or hydrostatic upset to unset the system. The third independent unset system is based on time decay and uses a completely dedicated unset line 28 and 29 for each hydraulic piston 9 and 19 respectively.

The operation of each of these unset systems will now be described with reference to FIGS. 2 to 16B. In FIGS. 2 to 7, the specific routes through the pressurisation lines to either set or unset each of the hydraulic pistons 9 and 19 have been made slightly thicker to highlight each of the respective systems. It is to be understood that this has been done for descriptive purposes only.

Figure 1:
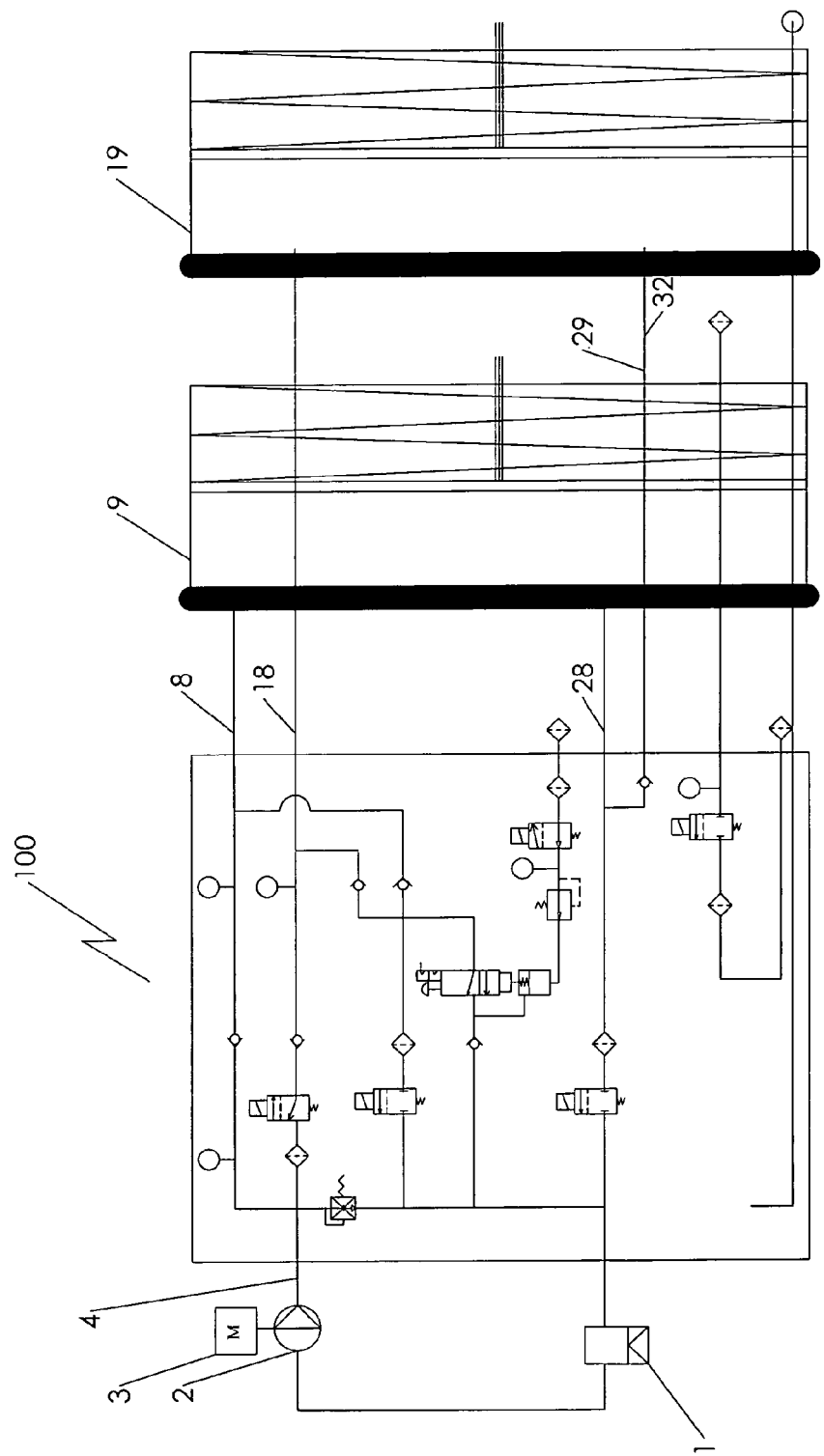
FIG. 1 is a schematic diagram of the hydraulic system of the present invention.
Figure 2:
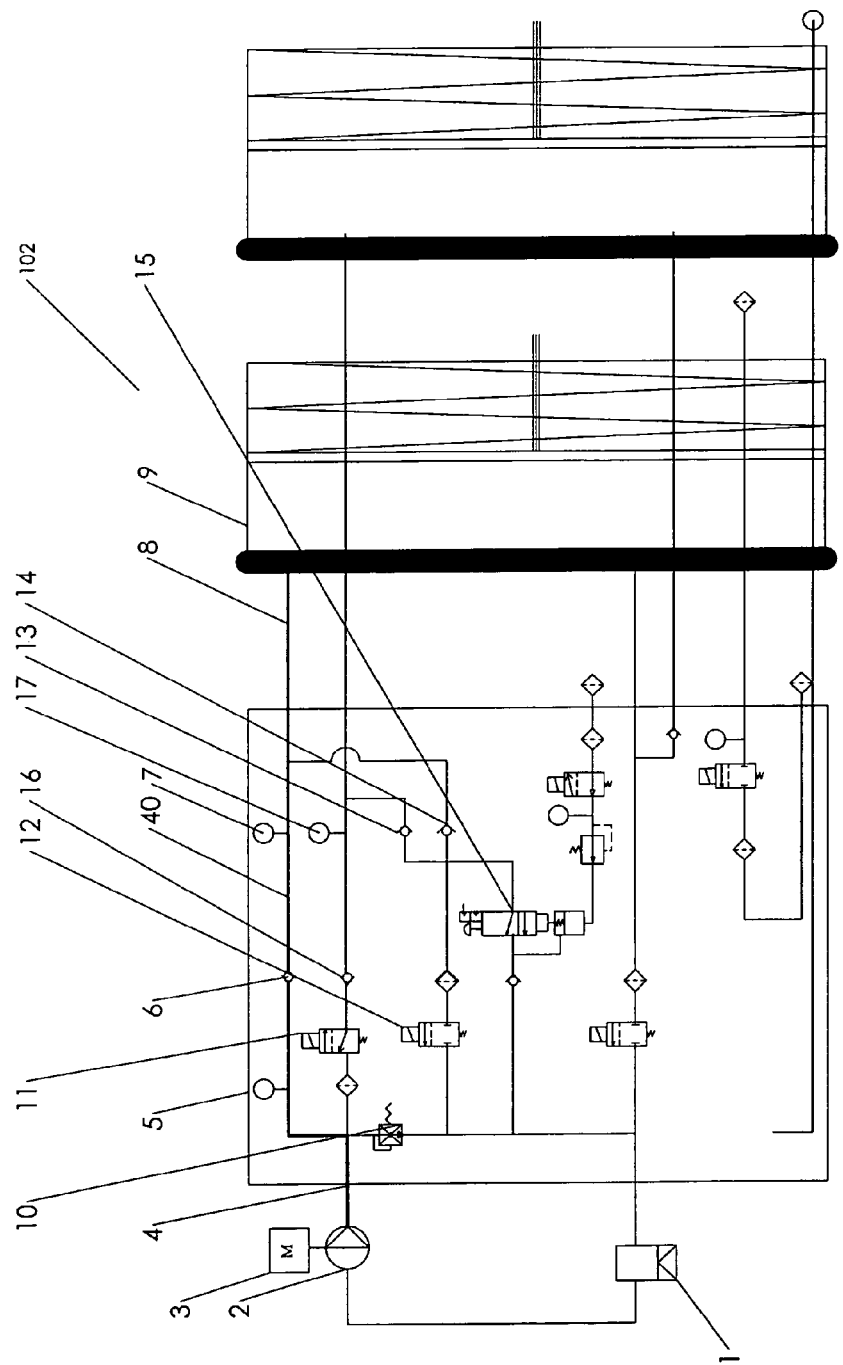
FIG. 2 is the schematic diagram of FIG. 1 showing the setting of a first hydraulic piston.
Figure 9B:
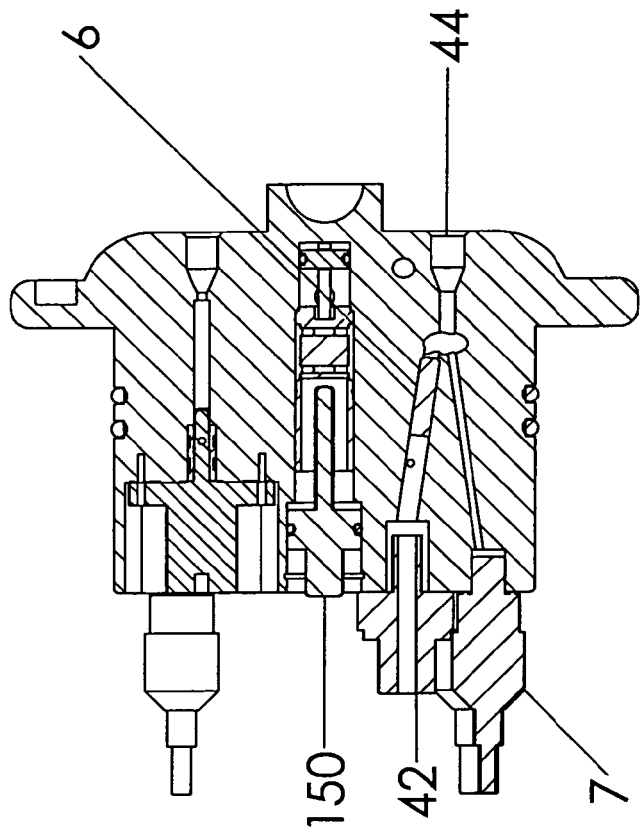
FIG. 9B is a section view of the manifold of FIG. 9A along the line A-A showing the pressurisation of the first hydraulic piston.
Figure 9A:
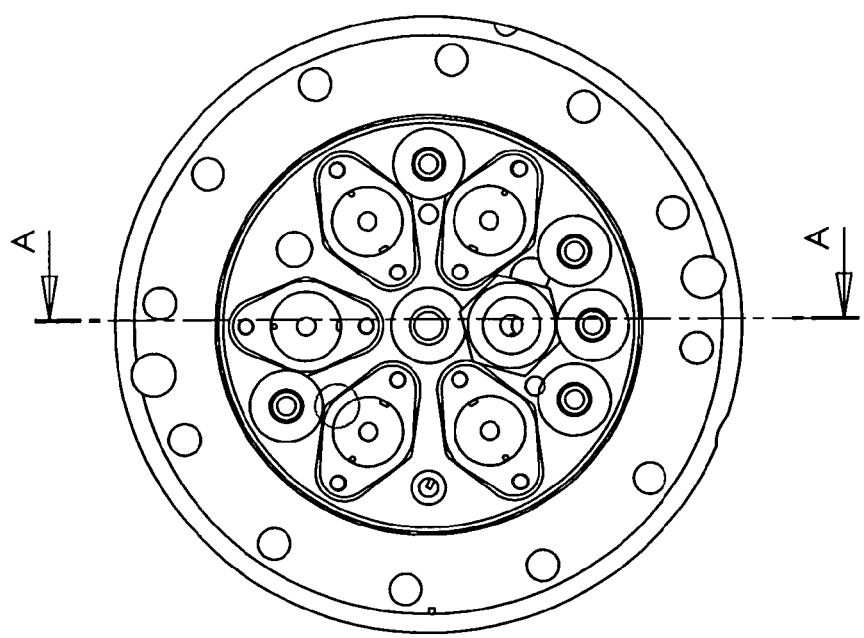
FIG. 9A is a bottom view of the manifold of the invention.

Referring initially to FIGS. 2, 9A and 9B, there is shown the means by which the manifold 100 operates to set hydraulic piston 9. The hydraulic pump 2 is driven by motor 3 to pressurise the hydraulic system through line 4 which is connected to pressurisation circuit 40 that is contained within the manifold 100. Pressurisation circuit 40 is connected to the first hydraulic piston 9 via pressurisation line 8. Pressurisation from pump 2 enters the manifold 100 at 42 and is connected to pressurisation line 8 at 44. The first hydraulic piston 9 operates to set plug one 102.

A first pressure transmitter 5 operates to read the pressure of hydraulic pump 2. A second pressure transmitter 7 operates to read the hydraulic pressure in the first hydraulic piston 9. A check valve 6 is provided to ensure that the circuit pressure is retained between the check valve 6 and the pressurisation circuit 40 to the first hydraulic piston 9. Once the pressure has reached 200 bar, the controller 101 stops the pump 2. Any hydraulic pressure in excess of 200 bar will lift the pressure relief valve 10 and allow the excess pressurised hydraulic fluid to pass through the pressure relief valve 10 to return the fluid to the accumulator 1.

Figure 3:
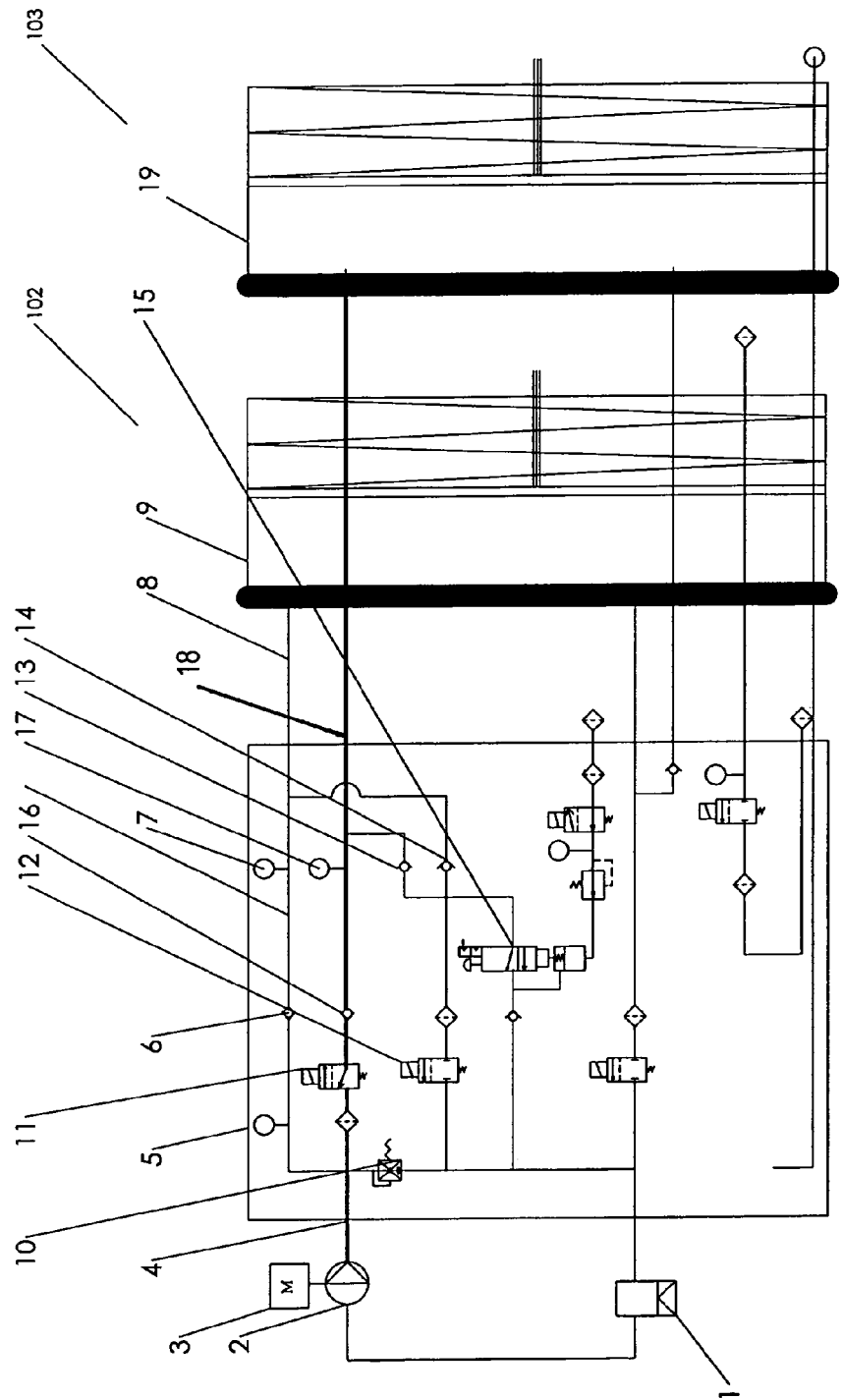
FIG. 3 is the schematic diagram of FIG. 1 showing the setting of a second hydraulic piston.
Figure 10B:
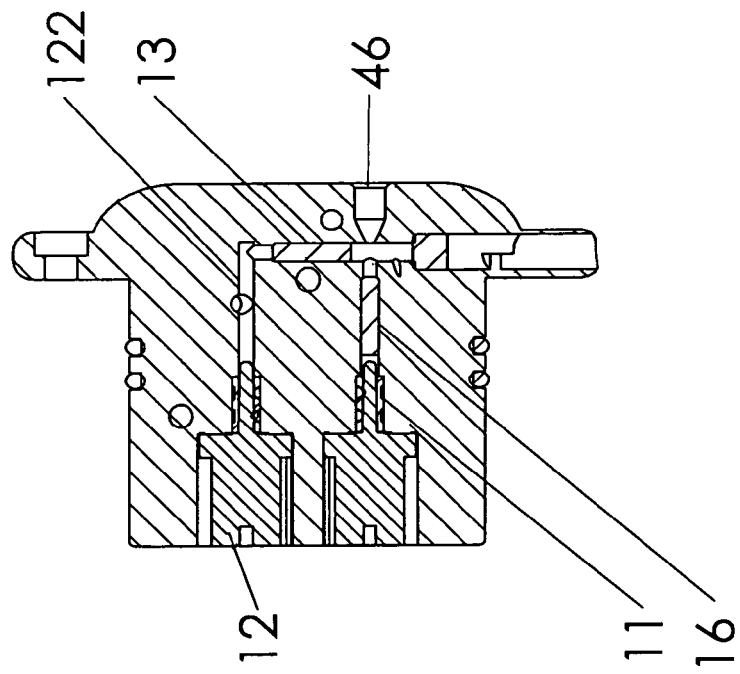
FIG. 10B is a section view of the manifold of FIG. 10A along the line B-B showing the pressurisation of the second hydraulic piston.
Figure 10A:
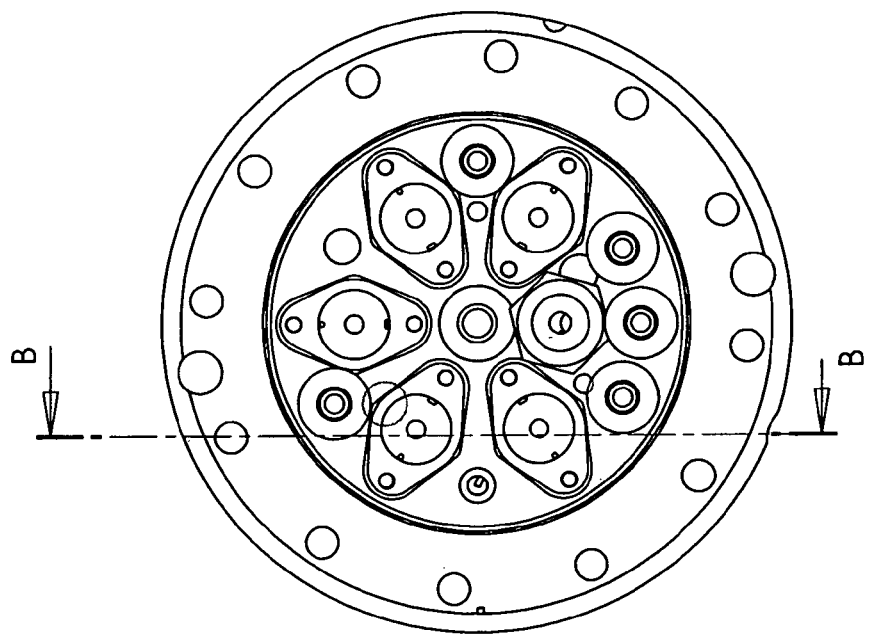
FIG. 10A is a bottom view of the manifold of the invention.

Referring to FIGS. 3, 10A and 10B, there is shown the means by which the manifold 100 operates to set hydraulic piston 19. Once hydraulic piston 9 has been set, switching valve 11 is operated to allow pump 2 to pressurise the pressurisation circuit 18 connected to the second hydraulic piston 19 through the manifold 100 at 46. Check valve 14 is employed to protect the hydraulic pressurisation circuit 40 connected to the first hydraulic piston 9, whilst the second hydraulic piston 19 is being pressurised from the pump 2. A second check valve 16 is used to retain the circuit pressure between the second check valve 16 and the second hydraulic piston 19. The second hydraulic piston 19 operates to set plug two 103.

A third pressure transmitter 17 operates to read the hydraulic pressure in the second hydraulic piston 19. As before once the pressure has reached 200 bar, an hydraulic pressure relief valve 10 will open and return the excess pressurised hydraulic fluid to the accumulator 1. Also shown in FIG. 10B is valve 12 in a closed position. Valve 12 is opened to unset both the first and second pistons 9 and 19 via pipework 122 positioned between check valve 13 and valve 12 in the primary independent unset system. Fluid is unable to pass to the accumulator 1 when valve 12 is in the closed position.

Figure 4:
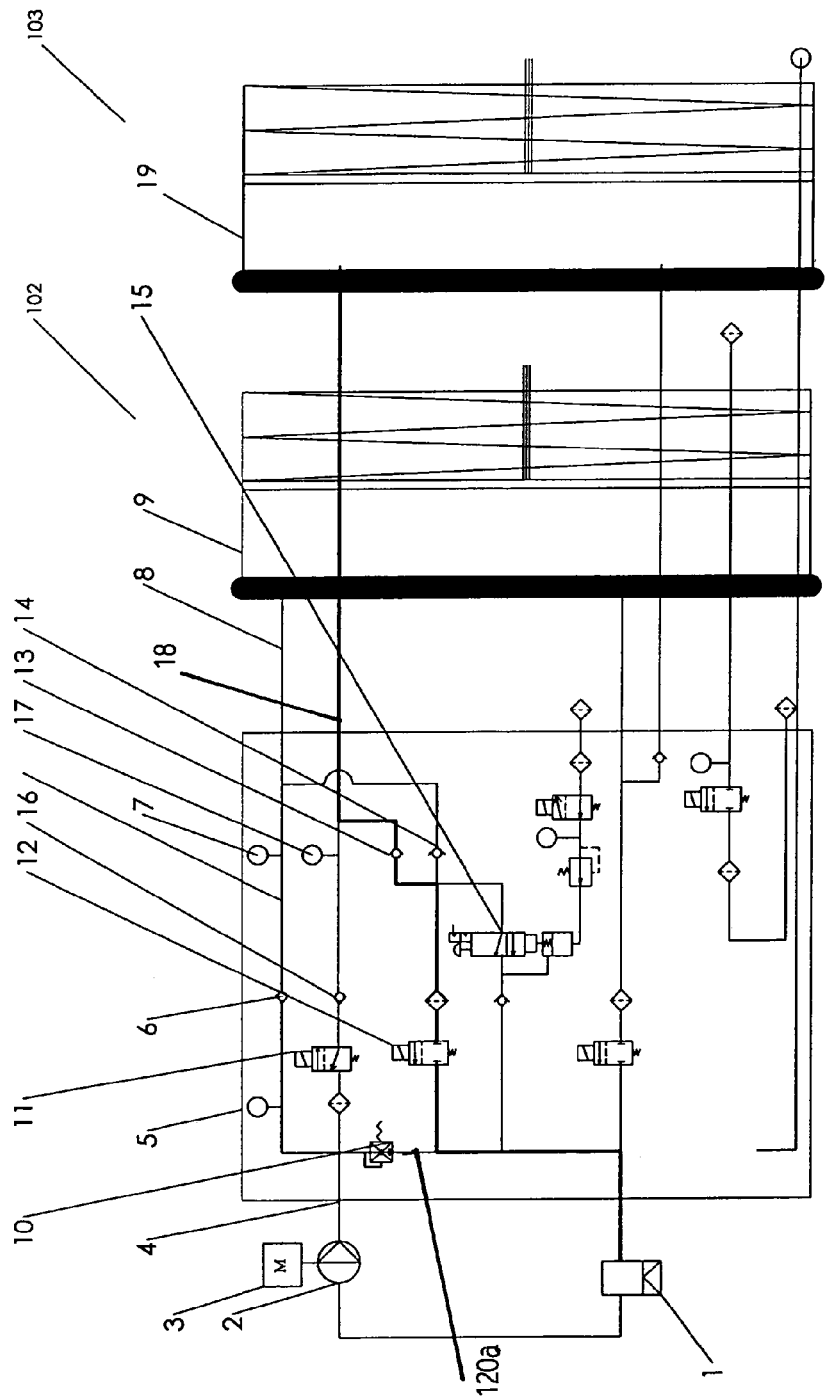
FIG. 4 is the schematic diagram of FIG. 1 showing the unsetting of the second hydraulic piston under normal conditions.
Figure 11B:
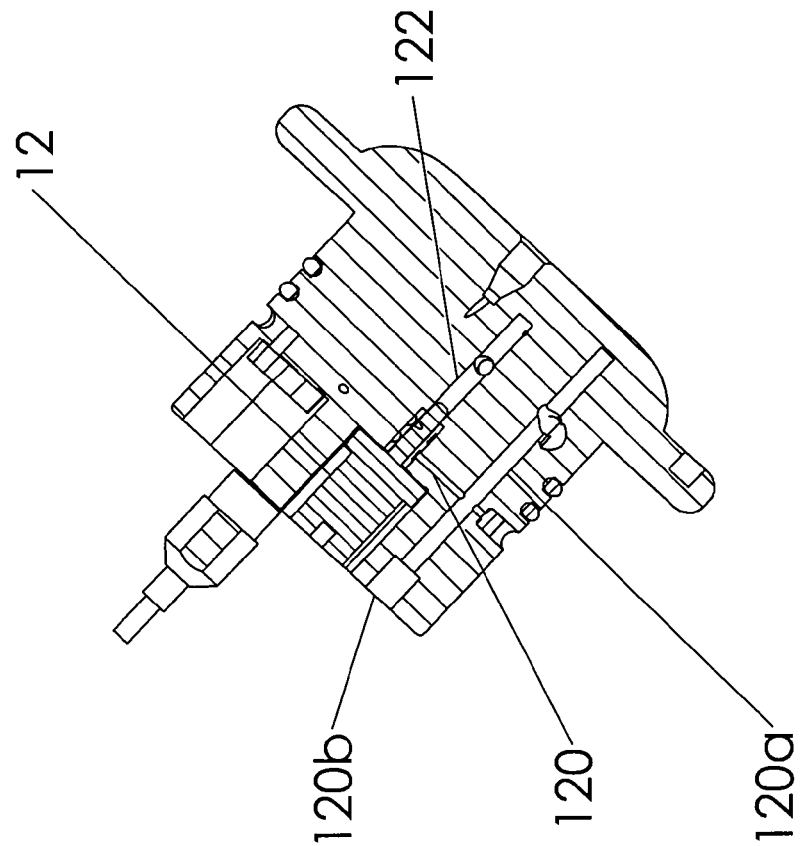
FIG. 11B is a section view of the manifold of FIG. 11A along the line C-C showing fluid return to the accumulator during normal unset of the first and second pistons.
Figure 11A:
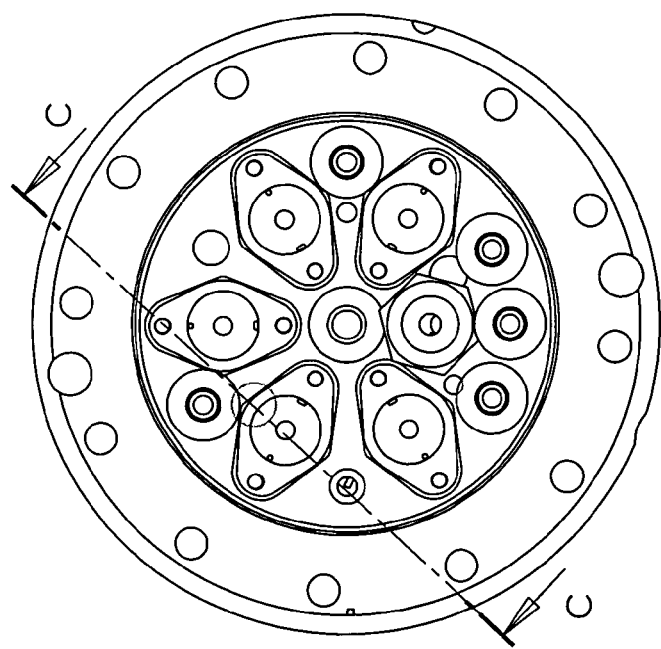
FIG. 11A is a bottom view of the manifold of the invention.
Figure 12B:
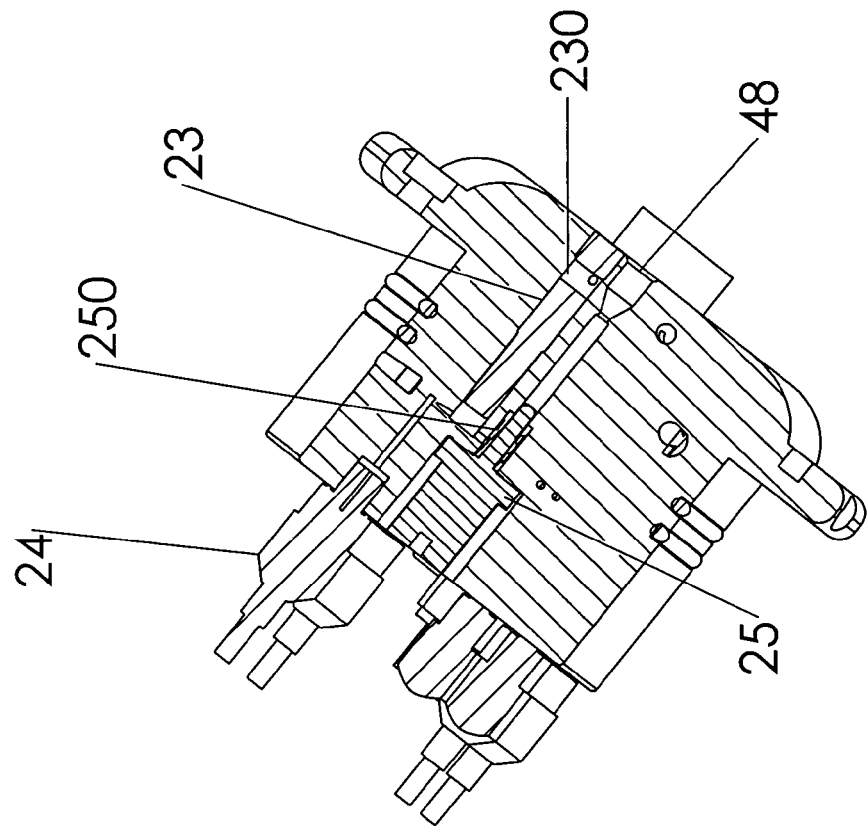
FIG. 12B is a section view of the manifold of FIG. 12A along the line D-D showing the trigger to initiate unsetting of the first and second hydraulic piston using the hydrostatic upset mechanism.
Figure 12A:
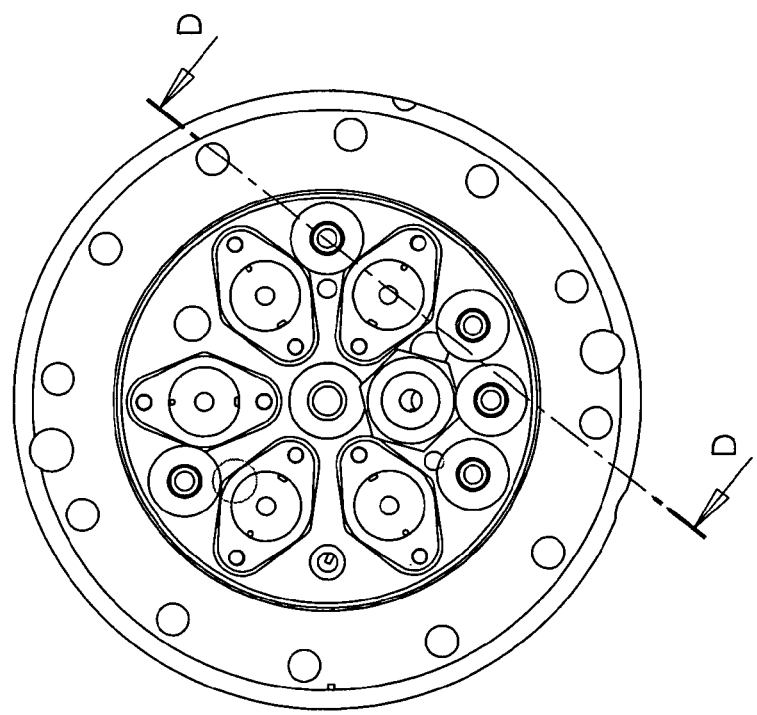
FIG. 12A is a bottom view of the manifold of the invention.
Figure 14C:
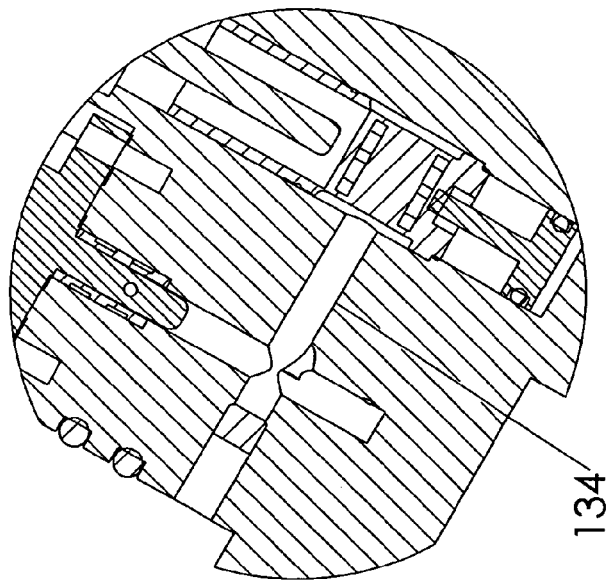
FIG. 14C is an enlarged view of section X of FIG. 14B.
Figure 14A:
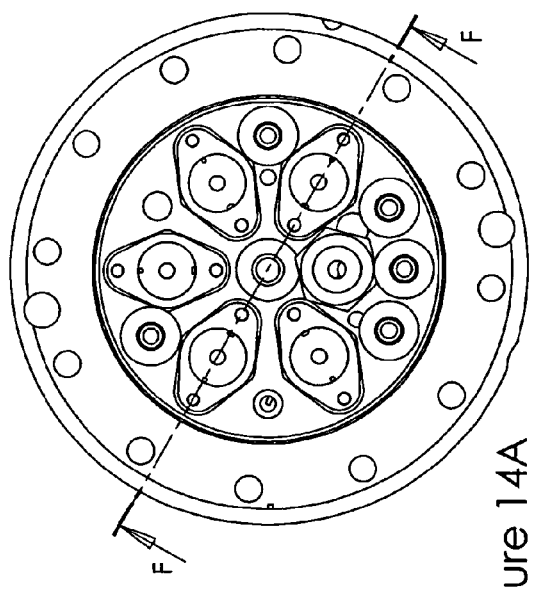
FIG. 14A is a bottom view of the manifold of the invention.
Figure 14B:
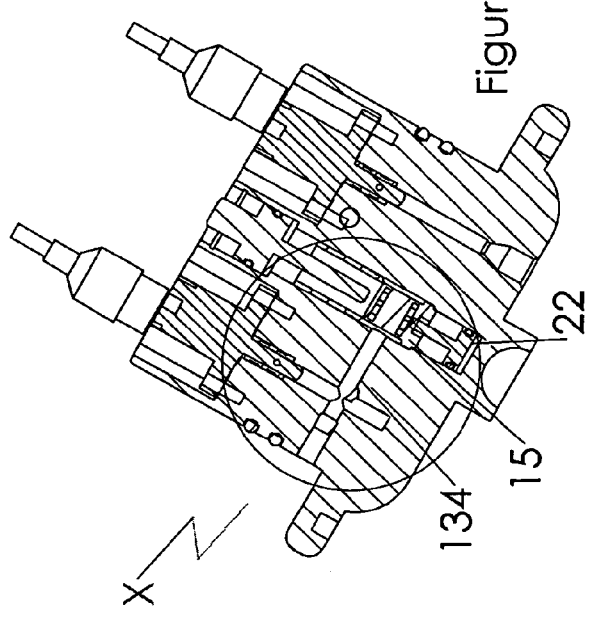
FIG. 14B is a section view of the manifold of FIG. 14A along the line F-F showing the movement of fluid into the integrated detenting valve of the hydrostatic upset mechanism.

Referring to FIGS. 4, 11A and 11B there is shown the means by which the manifold 100 operates to unset the second hydraulic piston 19 using the primary independent unset system. It is normal for the second hydraulic piston 19 to unset before the unset of the first hydraulic piston 9 in the primary independent unset system. This is due to the spring within the first hydraulic piston 9 being mechanically locked by compression from the second plug 103. Thus the hydraulic pressurisation system of the first plug 102 cannot unload until the hydraulic pressurisation system of the second plug 103 is fully unset. In order to unset the second hydraulic piston 19, valve 12 is opened using either ELF or acoustics electronic technology. Activation of valve 12 causes outlet 120 to open which allows the fluid from the piston 19 to decant and return to the accumulator 1 via route 120a and 120b thereby unsetting plug 103. Line 120a is the return to the accumulator 1 after pressure relief valve 10. Pipework 122 shown in FIG. 11B corresponds to the normal unset route pipework after check valves 13 and 14 of FIG. 4.

Figure 5:
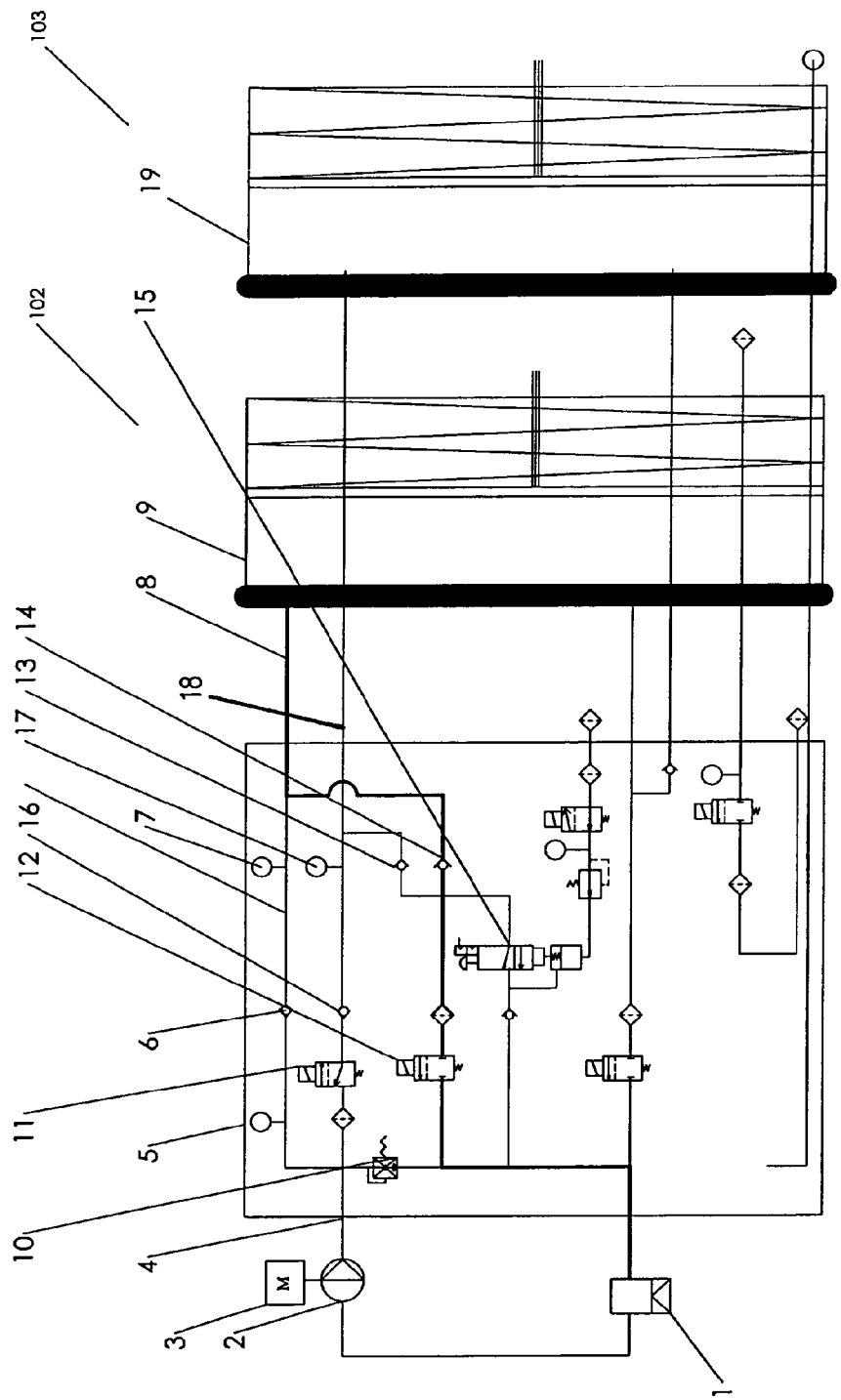
FIG. 5 is the schematic diagram of FIG. 1 showing the unsetting of the first hydraulic piston under normal conditions.
Figure 6:
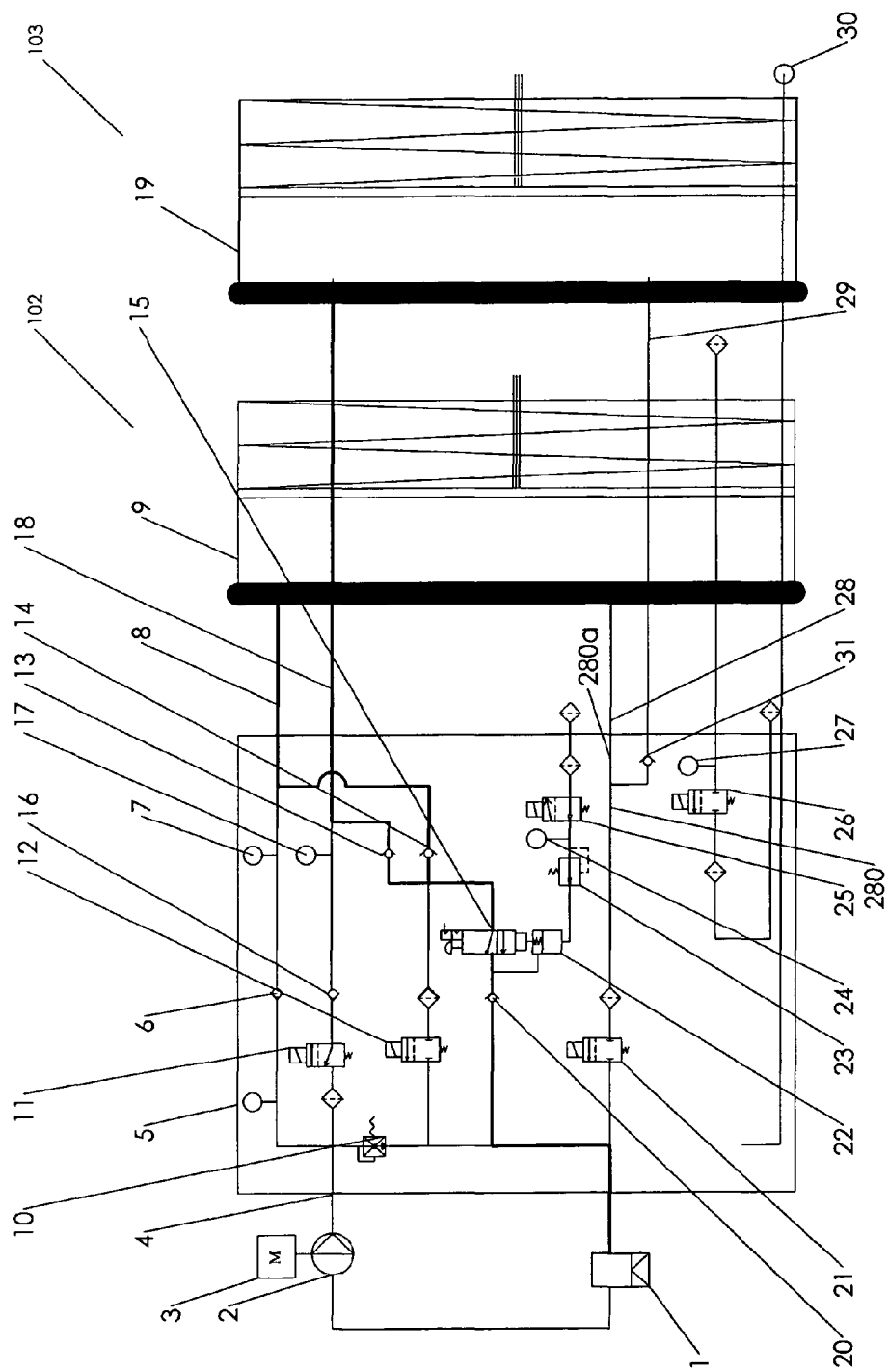
FIG. 6 is the schematic diagram of FIG. 1 showing the unsetting of the first and second hydraulic piston using the hydrostatic upset mechanism.

Referring to FIGS. 5, 11A and 11B, there is shown the means by which the manifold 100 operates to unset hydraulic pistons 9 and 19 using the primary independent unset system. Once the second hydraulic piston 19 has been fully unset, the hydraulic compression lock on piston 9 is released allowing piston 9 springs to push the fluid from piston 9 back to the accumulator 1 via lines 120a and 120b thereby unsetting plug 102.

Referring to FIGS. 6 and 12A to 15C there is shown the means by which the manifold 100 operates to unset the first and second hydraulic pistons 9 and 19 using the secondary independent unset system using hyperbaric or hydrostatic upset. Valve 25 is powered shut until the manifold 100 arrives at the correct position within the pipeline at which the pipeline plug apparatus will be set thereby plugging the pipeline. Once at the set location valve 25 is opened and remains this way during normal use. Input from upstream is fed to valve 25 in the manifold 100 via pipework 48. A feed 250 from valve 25 connects valve 25 to the back of pressure relief valve 23. A fourth pressure transmitter 24 operates to read the upstream pipeline pressure.

Once a predefined upstream pipeline pressure reading is detected, pressure relief valve 23 opens thereby causing fluid output to be transferred via pipework 230 to the face 220 of upset spindle 22. The pressure on the face 220 of upset spindle 22 causes upset spindle 22 to move forward which in turn causes the integrated detenting valve 15 to move into its detent position. Once the upset spindle 22 is activated the fluid from the first and second hydraulic pistons 9 and 19 decants into the integrated detenting valve 15 from check valves 13 and 14 via pressurisation line 134. The fluid is released back to the accumulator 1 via line 210 and check valve 20 when the upset spindle 22 has moved the integrated detenting valve 15 into the fully latched position thereby unsetting each of the plugs 102 and 103 respectively. As before, the first hydraulic piston 9 is unable to unset until the second hydraulic piston 19 has unset fully. The integrated detenting valve 15 is reset using button 150.

Figure 7:
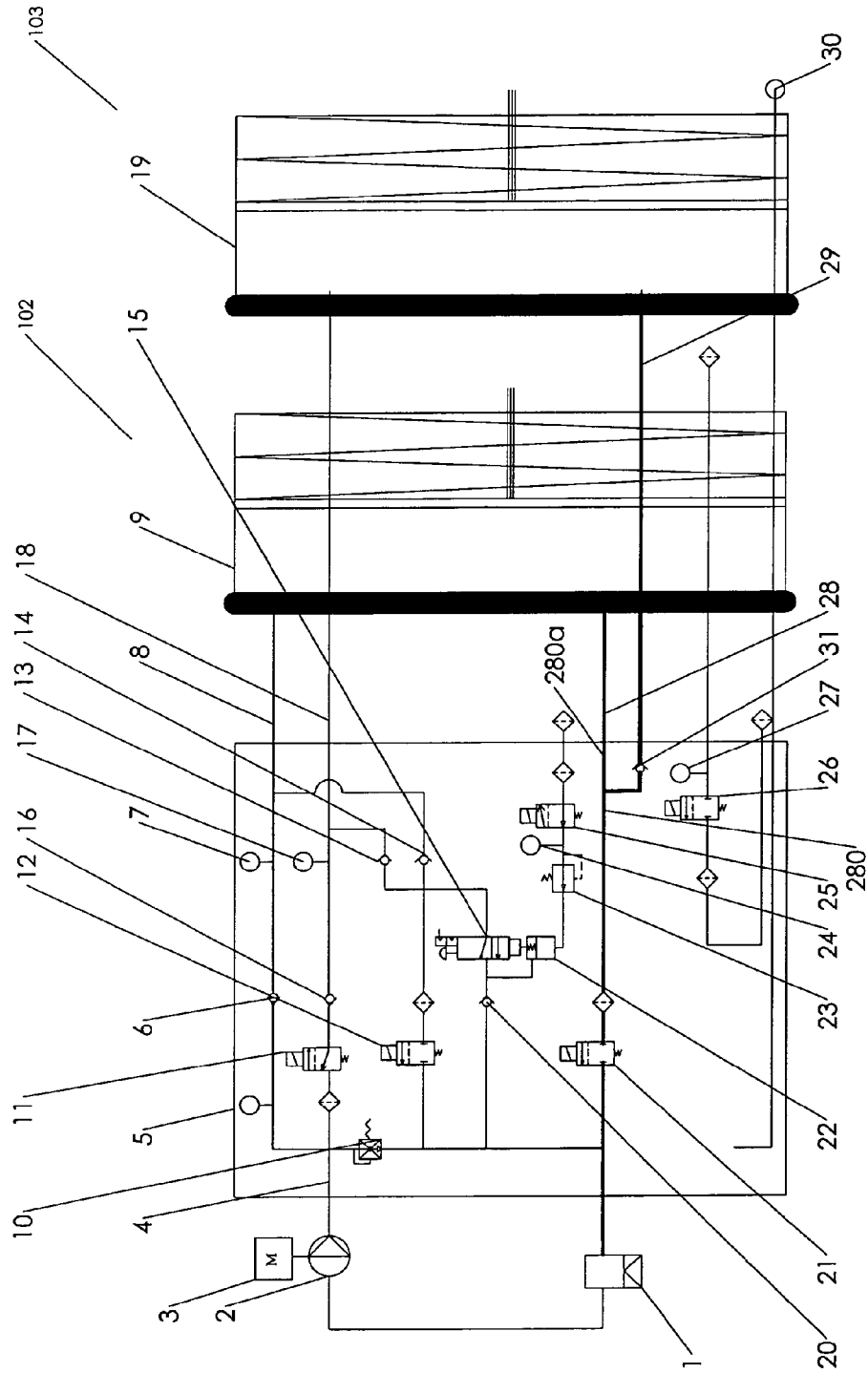
FIG. 7 is the schematic diagram of FIG. 1 showing the unsetting of the first and second hydraulic piston using the time decay mechanism.
Figure 16A:
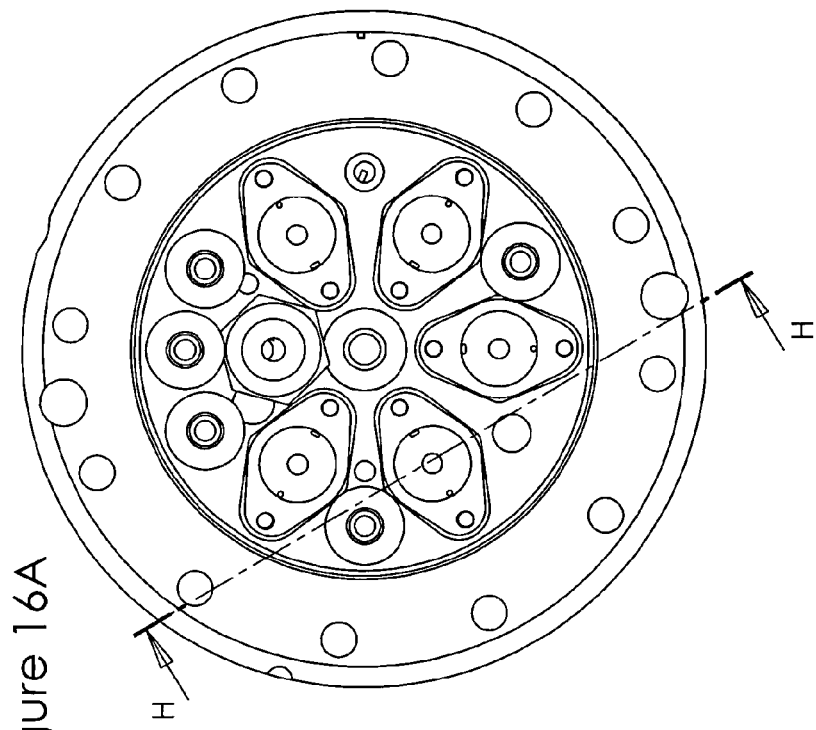
FIG. 16A is a bottom view of the manifold of the invention.
Figure 16B:
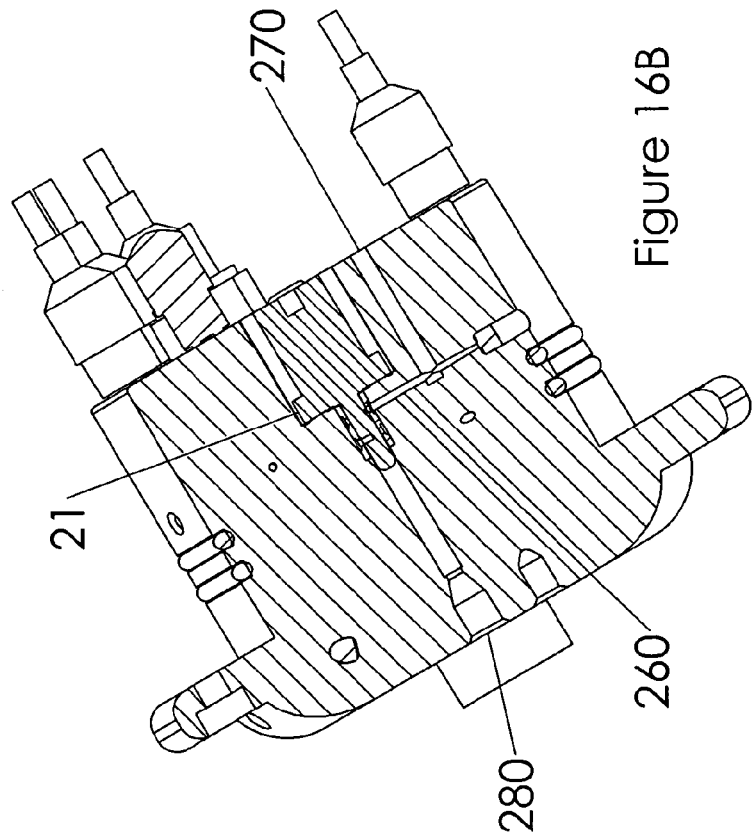
FIG. 16B is a section view of the manifold of FIG. 16A along the line H-H showing fluid return to the accumulator during unsetting of the first and second hydraulic piston using the time decay mechanism.

Referring to FIGS. 7, 16A and 16B, there is shown the means by which the manifold 100 operates to unset the first and second hydraulic pistons 9 and 19 using the third independent unset system. The third independent unset system is a mechanical system based on the principle of time decay which uses a completely dedicated depressurisation circuit 28 and 29 for each respective piston 9 and 19. The quantity of time which will decay is pre-decided by the operator prior to launch of the pipeline isolation plug.

Depressurisation circuit lines 28 and 29 feed into valve 21 within the manifold using input line 280. In FIG. 7 depressurisation circuit lines 28 and 29 are shown to join together at junction 280a to form line 280 within the manifold 100.

However in FIG. 16B, depressurisation lines 28 and 29 are joined together forming line 280 outside the manifold 100. Valve 21 is shut under normal operational conditions, it is preprogrammed to activate after a predetermined time period. Activation of valve 21 causes it to open by releasing its ball. Once activated valve 21 remains in a permanently open condition. Once open valve 21 allows all fluid from the two pistons 19 and 9 to decant back to the accumulator 1 via cross connecting line 260 and line 270. This enables plugs 103 and 102 unset. The time decay release unset system employs a Real Time Clock (RTC) which accurately measures time and allows events to be pre-programmed for future activation. The real time clock is powered by its own independent dedicated power supply. The real time clock is controlled by a separate oscillator (32.768 KHz).

Also shown in FIGS. 1 to 7 is an annulus control circuit 33 and the downstream pressure transmitter circuit 30. Specifically the annulus control circuit measures the pressure in the annulus gap between plug 102 and plug 103. The annulus control circuit 33 has a fifth pressure transmitter 27 which reads the annulus pressure between the first and second plugs 102, 103. Any increase in annulus pressure indicates a leak across the second plug 103 from downstream to annulus. Any decrease in annulus pressure indicates a leak across the first plug 102 from annulus to upstream. When plugs 102, 103 have been set, this annulus circuit monitors and manages the void space between the two sealing plugs 102, 103. Plugs 103, 102 do not unset until they have been both hydraulically unset and the upstream and downstream delta pressures are balanced or equal, across the plugs 103, 102. If there is still a minimum delta pressure differential between the upstream and downstream sides of the plug or plugs 102, 103, then the plug or plugs 102, 103 will remain set and sealed. Valve 26 is used to control the annulus control circuit 33. The downstream pressure transmitter circuit has a sixth pressure transmitter 30 which reads the downstream pipeline pressure to establish the differential delta across the pipeline plug 102, 103.

Figure 8:
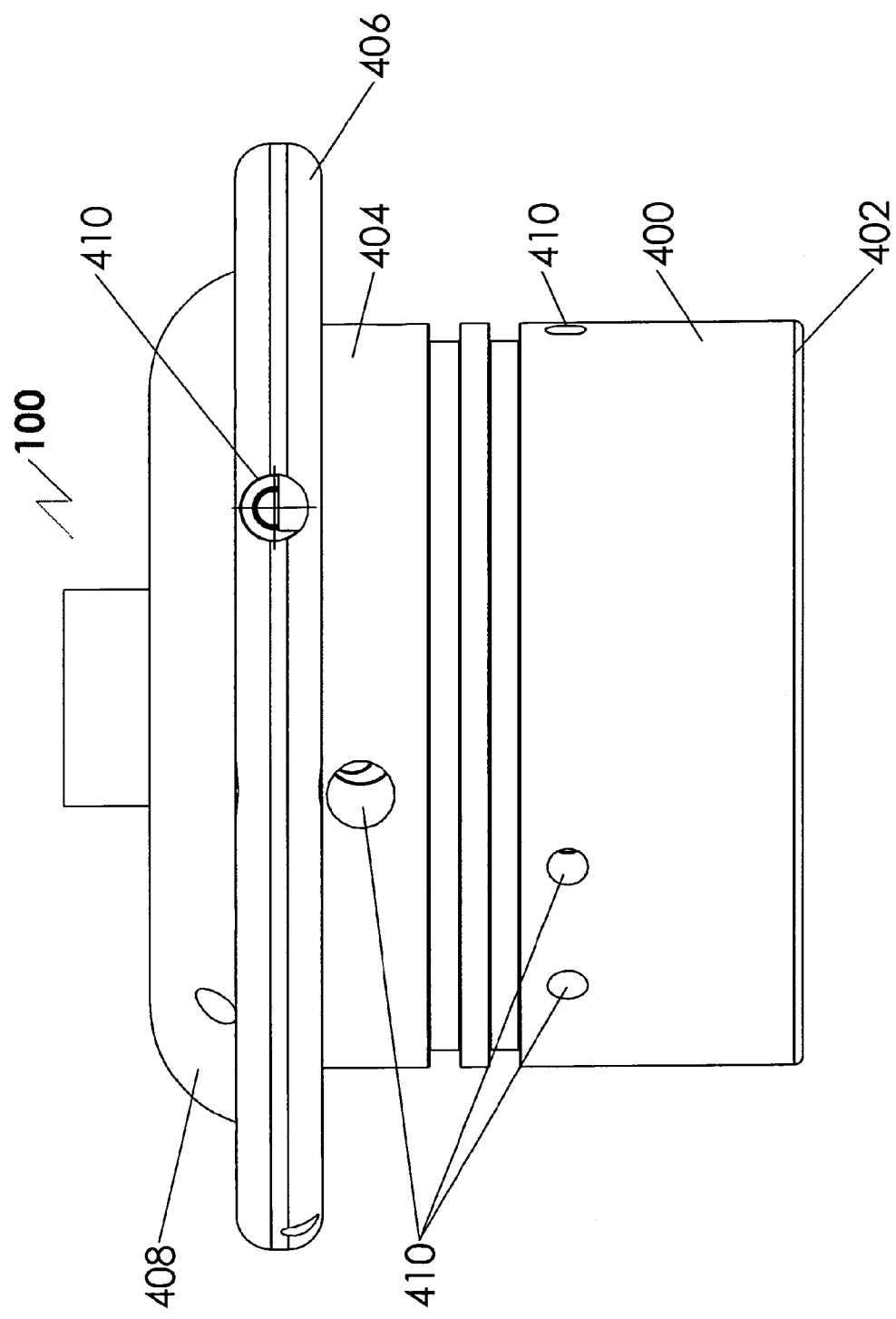
FIG. 8 is a side view of the manifold of the invention.

Referring now to FIG. 8, there is shown a side view of the manifold 100 of the present invention. The manifold 100 comprises an open ended cylindrical housing 400 having a first end 402 and a second end 404. An outwardly extending flange 406 surrounds the circumferential edge of the second end 404 of the housing 400. The flange 406 surrounding the second end 404 of the housing 400 further comprises a closure member 408 which extends over the cylindrical housing thereby enclosing the controller components seated within the manifold 100. The flange 406 provides a robust fixing method for the manifold 100 within the housing 501 of the control pod 500. A plurality of openings indicated generally by the reference numeral 410 are present on the body of the manifold. Referring to FIG. 9A, the reset button 150 for the integrated detenting valve 15 is positioned within the manifold such that a user is able to easily access the reset button 150.

It will of course be understood that the invention is not limited to the specific details described herein, which are given by way of example only, and that various modifications and alterations are possible within the scope of the invention as defined in the appended claims.

The invention claimed is:

1. An hydraulic system for an autonomous multi-set pipeline isolation tool comprising:
   at least two hydraulic pistons;
   a pump for operating the pistons;
   an accumulator between each of the hydraulic pistons and the pump;

means for operating the pump; and a manifold comprising a plurality of fluid pipelines positioned between the pump and the hydraulic pistons, the manifold being operable to control the flow of fluid in the fluid pipelines to control the operation of the pistons which actuate gripping and sealing means of the autonomous multi-set pipeline isolation tool.

2. An hydraulic system as claimed in claim 1, wherein the manifold further comprises a plurality of valves arranged within the fluid pipelines.

3. An hydraulic system as claimed in claim 2, wherein the valves are selected from one or more of: solenoid valves, check valves, trigger valves, detenting valves, pressure relief valves and shuttle valves.

4. An hydraulic system as claimed in claim 2, wherein the valves are positioned in line with one or more pressure transmitters.

5. An hydraulic system as claimed in claim 4, wherein the pressure relief valves are in communication with one or more pressure transmitters.

6. An hydraulic system as claimed in claim 2, wherein the valves comprise an integrated detenting valve which is in communication with a pre-set pressure relief valve.

7. An hydraulic system as claimed in claim 1, wherein the manifold comprises a triple redundancy fail safe unset system.

8. An hydraulic system as claimed in claim 7, wherein the triple redundancy fail safe unset system comprises independently operable primary, secondary and tertiary unset systems.

9. An hydraulic system as claimed in claim 8, wherein each of the unset systems comprises a depressurisation circuit which is coupled with each of the pistons.

10. An hydraulic system as claimed in claim 9, wherein the depressurisation circuit further comprises activation means.

11. An hydraulic system as claimed in claim 8, wherein the primary unset system comprises an ELF electrical unset system.

12. An hydraulic system as claimed in claim 8, wherein the secondary unset system comprises a hyperbaric or hydrostatic upset unset system.

13. An hydraulic system as claimed in claim 8, wherein the tertiary unset system comprises a timed decay unset system.

14. An hydraulic system as claimed in claim 1, wherein the hydraulic system comprises a controller.

15. An hydraulic system as claimed in claim 14, wherein the controller comprises at least a power supply unit and a central processing unit.

16. An hydraulic system as claimed in claim 14, wherein the controller comprises one or more of: a hydraulic management module, a valve management module, a communications module, a diagnostics module, a monitoring module and a safety module.

17. An hydraulic system as claimed in claim 16, wherein the modules of the controller are provided on a single circuit board.

18. An hydraulic system as claimed in claim 14, wherein the controller further comprises interrogation means for monitoring output values from pressure sensors, Linear Variable Differential Transformers (LVDT), valve controllers, the hydraulic pump motor and power supplies.

19. An hydraulic system as claimed in claim 18, wherein the controller further comprises interpretation means for analysing output values received from the interrogation means.

20. An hydraulic system as claimed in claim 18, wherein the controller further comprises means for generating and transmitting signals both in response to output values received from the interrogation means and in response to pre-programmed operating instructions to operate the valve controllers and the hydraulic pump motor to set and unset the autonomous pipeline isolation tool.

21. An hydraulic system as claimed in claim 14, wherein the controller further comprises an audio communication control system that uses acoustic or audio algorithms for through pipe wall communication.

22. An hydraulic system as claimed in claim 1, wherein the means for operating the pump comprises a motor which is powered by a 12 volt power supply unit.

23. An hydraulic system as claimed in claim 1, further comprising a housing, wherein the geometry of the housing is configured to enable articulation of the hydraulic system around a 3D bend within a pipeline having an inner diameter of the order of 0.15 m (6") and upwards.

24. An hydraulic system as claimed in claim 23, wherein the housing is a sealed unit surrounding and encapsulating the controller and hydraulic system.

25. An hydraulic system as claimed in claim 23, wherein the housing comprises articulation means configured to couple an end of the housing to an end of a module of an autonomous pipeline isolation tool.

26. An hydraulic system as claimed in claim 25, wherein the articulation means comprises an articulating double ball and socket joint.

27. An autonomous multi-set pipeline isolation tool comprising;

a pressure plate module with gripping and sealing means encircling the pressure plate module, the gripping and sealing means being operable by an hydraulic system comprising at least two hydraulic pistons;

a pump for operating the pistons;

an accumulator between each of the hydraulic pistons and the pump;

means for operating the pump; and a manifold comprising a plurality of fluid pipelines positioned between the pump and the hydraulic pistons, the manifold being operable to control the flow of fluid in the fluid pipelines to control the operation of the pistons which actuate gripping and sealing means of the autonomous multi-set pipeline isolation tool.

28. An hydraulic system for an autonomous multi-set pipeline isolation tool comprising:

at least one hydraulic piston;

a pump for operating the pistons;

an accumulator between each of the hydraulic pistons and the pump;

means for operating the pump; and a manifold comprising a plurality of fluid pipelines positioned between the pump and the hydraulic pistons, the manifold being operable to control the flow of fluid in the fluid pipelines to control the operation of the pistons which actuate gripping and sealing means of the autonomous multi-set pipeline isolation tool, wherein the manifold comprises a triple redundancy fail safe unset system.

* * * * *